(12) United States Patent
Boch et al.

(10) Patent No.: US 7,689,874 B2
(45) Date of Patent: Mar. 30, 2010

(54) DATA PROCESSING DEVICE AND METHOD FOR MONITORING CORRECT OPERATION OF A DATA PROCESSING DEVICE

(75) Inventors: Robin Boch, Munich (DE); Gerd Dirscherl, Munich (DE); Stefan Erdmenger, Augsburg (DE); Udo Kriebel, Diedorf (DE)

(73) Assignee: Infineon Technologies AG, Neubiberg (DE)

( * ) Notice: Subject to any disclaimer, the term of this patent is extended or adjusted under 35 U.S.C. 154(b) by 552 days.

(21) Appl. No.: 11/609,253

(22) Filed: Dec. 11, 2006

(65) Prior Publication Data

US 2010/0042995 A9     Feb. 18, 2010

(30) Foreign Application Priority Data

Jul. 31, 2006   (DE) .................. 10 2006 035 662

(51) Int. Cl.
*G06F 11/00*     (2006.01)
(52) U.S. Cl. ....................................... 714/51
(58) Field of Classification Search .............. 714/34, 714/51
See application file for complete search history.

(56) References Cited

U.S. PATENT DOCUMENTS

| | | | | |
|---|---|---|---|---|
| 3,806,716 A | * | 4/1974 | Lahti et al. ................... | 714/805 |
| 4,322,791 A | * | 3/1982 | Ishii .............................. | 714/2 |
| 4,639,881 A | * | 1/1987 | Zingher ....................... | 715/839 |
| 4,937,777 A | * | 6/1990 | Flood et al. ................. | 710/107 |
| 5,027,358 A | * | 6/1991 | O'Dell et al. ................. | 714/55 |
| 5,301,325 A | * | 4/1994 | Benson ........................ | 717/159 |
| 5,983,370 A | * | 11/1999 | Anderson ..................... | 714/49 |
| 6,000,028 A | * | 12/1999 | Chernoff et al. ............. | 712/226 |
| 6,167,479 A | * | 12/2000 | Hartnett et al. .............. | 710/260 |
| 6,374,350 B1 | * | 4/2002 | D'Sa et al. ................... | 712/239 |
| 6,701,460 B1 | | 3/2004 | Suwandi et al. | |
| 6,704,894 B1 | | 3/2004 | Kania | |
| 2001/0007124 A1 | * | 7/2001 | Iwamura et al. .............. | 711/165 |
| 2005/0229044 A1 | * | 10/2005 | Ball ............................ | 714/38 |

* cited by examiner

*Primary Examiner*—Scott T Baderman
*Assistant Examiner*—Yair Leibovich
(74) *Attorney, Agent, or Firm*—Dickstein, Shapiro, LLP.

(57) ABSTRACT

A method for monitoring the correct operations of a data processing device including changing a subsystem from an authorized state to an unauthorized state, executing the partial operating sequence, and resetting any subsystem state from the unauthorized state to the authorized state.

17 Claims, 2 Drawing Sheets

TB1 { Change the subsystem state to an unauthorized state

TB1
TB2 { Execute TB2
TB3

{ Reset the subsystem state to an authorized state

{ Evaluate the subsystem state TB3

TB1
Change the subsystem state to an unauthorized state

TB1
TB2    Execute TB2
TB3
Reset the subsystem state to an authorized state

Evaluate the subsystem state TB3

DATA PROCESSING DEVICE AND METHOD FOR MONITORING CORRECT OPERATION OF A DATA PROCESSING DEVICE

CROSS-REFERENCE TO RELATED APPLICATION

This application claims priority to German Patent Application Serial No. 10 2006 035 662.4, filed Jul. 31, 2006, and which is incorporated herein by reference in its entirety.

BACKGROUND

Data processing devices are controlled using programs which includes a sequence of instructions that can be executed in order to achieve a particular functionality. The high flexibility of data processing devices is based on the fact that, in programs, individual steps can be executed not only sequentially but also with branches in the sequence. For a data processing device to operate correctly, the correct program flow, that is the correct order in which the individual instructions are executed, is required. Unexpected changes in the sequence lead to incorrect results or even to operation of the data processing device being stopped. Such changes may be caused, for example, by faults in the hardware or in the programs. Furthermore, external attacks in which the correct operation of a data processing device is deliberately disrupted in order to gain an advantage are conceivable.

In order to avoid faults during the operation of a data processing device, hardware and software are verified, that is, they are checked for the correct method of operation. Unfortunately, some faults remain undiscovered during verification since not all possible situations can be covered. These include, in particular, limiting cases which occur when different parts of a program interact, in which case it is not possible to verify the individual parts together. Faults in the program flow may result in failure of the data processing device or in security gaps which can be exploited.

External attacks which influence the operation of a data processing device may be detected using suitable hardware measures. These include checkpoint registers, in which values are compared with expected values during operation, glitch sensors, which detect very brief voltage dips or increases in the current or clock supply, frequency sensors, which are used to detect changes in the clock frequency, in particular underfrequencies, or single-step operation, and light sensors, which can be used to detect manipulation of the chip during optical analysis. Hardware measures can be used only in specialized safety processors, the use of analog sensors frequently requiring redesign, in particular.

DESCRIPTION OF THE INVENTION

Figures 1, 2:
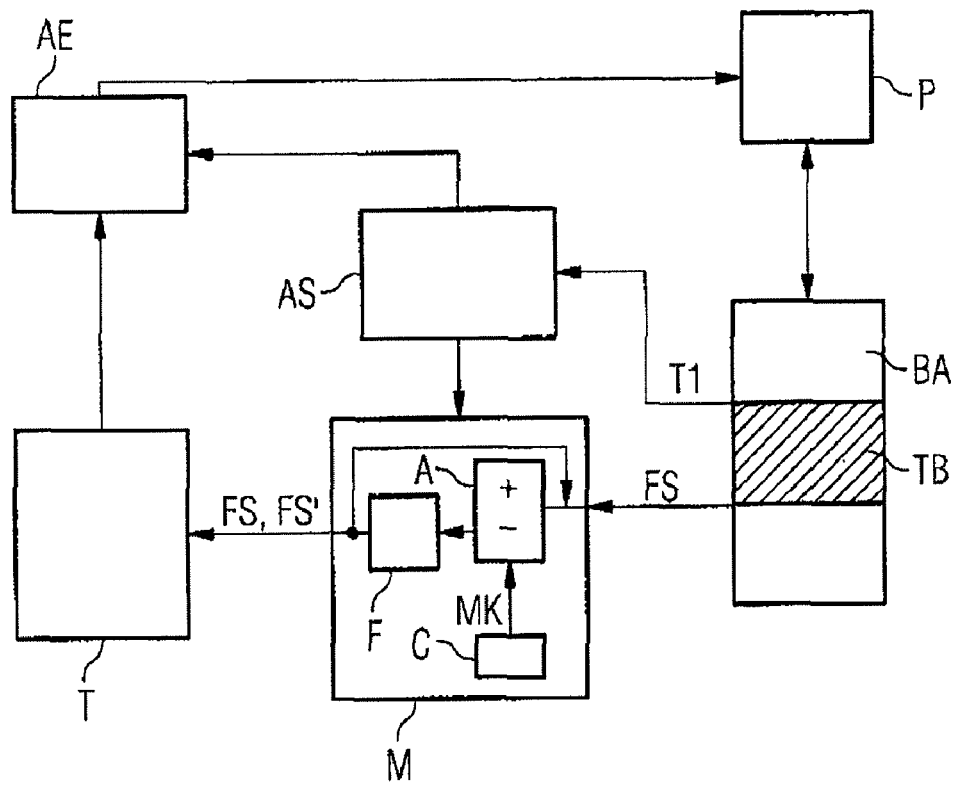
FIG. 1 shows a block diagram of an exemplary embodiment of the data processing device according to the invention.
FIG. 2 shows a principle on which the invention is based.

In an embodiment a method for monitoring the correct operation of a data processing device, the method having the steps of changing a subsystem from an authorized state to an unauthorized state before a partial operating sequence is executed, the unauthorized state not interfering with the execution of the partial operating sequence as long as the state of the subsystem is not being evaluated, executing the partial operating sequence, resetting the subsystem state from the unauthorized state to the authorized state after the partial operating sequence has been executed, and evaluating the subsystem state.

If the partial operating sequence is fully executed properly, the subsystem state is reset from the unauthorized state to the authorized state before evaluation. During evaluation, the subsystem state is then in an authorized state. If, in contrast, the partial operating sequence is disrupted and is not ended correctly, the subsystem is still in an unauthorized state. This unauthorized state is detected by evaluating the subsystem state and the necessary measures, for example adjusting the operation of the data processing device, are taken.

In an embodiment, the data processing device carries out the abovementioned steps during operation. If the evaluation of the subsystem state revealed an authorized state, the data processing device continues operation at a continuation point for the partial operating sequence.

Operation of the data processing device may include a plurality of partial operating sequences, the process being continued, after the subsystem state has been evaluated, only if the subsystem is in an authorized state. This ensures that the partial operating sequence has been fully executed correctly, and operation of the data processing device is continued only if no unexpected interruptions in the partial operating sequence have occurred.

In an embodiment, the subsystem state is described by a continuation point.

Depending on the continuation point, the subsystem state is in an authorized state or an unauthorized state.

In an embodiment, in the authorized state, the continuation point is the continuation point for the partial operating sequence.

In order to monitor the correct operation of the data processing device, the continuation point for the partial operating sequence is modified before the partial operating sequence is executed and, after the latter has been successfully executed, is reset again to the correct continuation point for the partial operating sequence. If the partial operating sequence is disrupted in any way, with the result that the continuation point is not reset from an unauthorized continuation point to the authorized continuation point for the partial operating sequence, the unauthorized continuation point is detected when evaluating the subsystem state.

In an embodiment, in the unauthorized state, the continuation point is an invalid continuation point which does not correspond to the continuation point for the partial operating sequence.

An invalid continuation point can be detected when evaluating the subsystem state, the continuation point being selected in such a manner that operation of the data processing device is ended or interrupted in a determinate manner.

In an embodiment, the invalid continuation point is reversibly determined from the continuation point for the partial operating sequence.

In order to change the subsystem from an authorized state to an unauthorized state before the partial operating sequence is executed, and in order to change the subsystem state from the unauthorized state to the authorized state after the partial operating sequence has been executed, it is necessary for the continuation point for the partial operating sequence to be able to be determined from the invalid continuation point.

In an embodiment, instructions for changing the subsystem state from an authorized state to an unauthorized state before the partial operating sequence to be monitored, instructions for resetting the subsystem state from the unauthorized state to the authorized state, and instructions for evaluating the subsystem state after the partial operating sequence to be monitored are inserted into a program which controls the partial operating sequence.

The method for monitoring the correct operation of the data processing device can be implemented by inserting the appropriate instructions into the program which controls the partial operating sequence.

In an embodiment, the instructions are automatically inserted into the program when compiling or interpreting the program.

As a result of the fact that the instructions which are needed to monitor the correct operation of the data processing device are automatically inserted into the program which controls the partial operating sequence, the method can be used for any desired data processing devices without great expenditure. In particular, the method is thus independent of the platform and application program.

In an embodiment, the continuation point is a return address of the program which controls the partial operating sequence.

As a result of the use of a return address to represent the subsystem state, there is no need to explicitly check the subsystem state since the return address is automatically evaluated during the partial operating sequence, with the result that the method can be implemented with very little overhead.

In an embodiment, the invalid continuation point is a return address which is generated by adding a constant or a random number from the return address of the program for controlling the partial operating sequence.

In this case, the constant or random number is selected in such a manner than an invalid return address which results in a fault during return is generated. In this case, the fault can be triggered, for example, by access to a nonexistent memory area.

In an embodiment, in order to reset the subsystem state from the unauthorized state to the authorized state after the partial operating sequence has been executed, addition of the constant or of the random number is reversed.

As a result of the addition being reversed, the correct return address of the program which controls the partial operating sequence is obtained again and does not cause a fault during evaluation, that is to say during return.

In an embodiment, the subsystem state is evaluated using a memory management unit or a memory protection unit.

If the subsystem state is denoted using a return address, a memory management unit or a memory protection unit can be used to detect whether the address is valid and authorized or invalid and unauthorized. In this case, it is advantageous that there is no need for an additional memory for storing the subsystem state and that memory management units or memory protection units are present in most hardware platforms of data processing devices.

In an embodiment, the unauthorized state triggers an alarm, an abort, a fault, an exception or a trap in the data processing device.

State monitoring mechanisms which are already present in the data processing device can thus be used to monitor correct operation without the need for additional hardware expenditure. State monitoring mechanisms are intended to mean all mechanisms in the data processing device which are suitable for triggering an alarm, an abort, a fault, an exception or a trap.

In an embodiment, the unauthorized state interrupts operation of the data processing device during evaluation.

If, for example, an attempt is made to execute an unauthorized branch in the data processing device, as a result of which the subsystem state cannot be reset from the unauthorized state to the authorized state, this is indicated by interrupting operation. This makes it possible to detect faults and attacks and to protect security-sensitive data.

There is also provided a data processing device which includes a processor, a subsystem which can assume an authorized state and an unauthorized state, a sequence controller, a modification device for modifying a continuation point, a continuation point memory for storing a continuation point, and an evaluation unit for evaluating a state of the subsystem. In this case, the sequence controller is designed in such a manner that it stores a continuation point for a partial operating sequence in the continuation point memory before the partial operating sequence is executed by the processor, uses the modification device to change the continuation point in such a manner that, when a state of the subsystem is being evaluated by the evaluation unit, an unauthorized state is detected, uses the modification device to reverse the change in the continuation point after the partial operating sequence has been executed by the processor and changes the subsystem state from the unauthorized state to the authorized state, and evaluates the state of the subsystem in the evaluation unit.

The sequence controller modifies the partial operating sequence in such a manner that the continuation point for the latter is first of all changed in such a manner that it would lead to an unauthorized state during evaluation. Given the correct sequence of the partial operating sequence, this change is reversed, with the result that no unauthorized state is detected during evaluation. If, in contrast, the partial operating sequence is not ended properly, the change in the continuation point is not reversed either, with the result that the subsystem remains in the invalid state.

In an embodiment, the continuation point is a return address of a program which controls the partial operating sequence.

The authorized state corresponds to the correct return address of the program, while the unauthorized state corresponds to an illegal return address.

In an embodiment, the evaluation unit is a memory management unit or a memory protection unit of the processor.

The memory management unit or memory protection unit is responsible for memory management. A valid or authorized return address results in the next instruction being executed after the partial operating sequence, while an illegal, invalid or unauthorized return address results in a fault message. This makes it possible to use the already existing hardware of the processor to implement an evaluation unit which can be used to monitor the operation of the data processing device.

In an embodiment, the sequence controller is implemented using the processor.

A separate processor is thus not needed for the sequence controller; the latter can be implemented using the already existing processor of the data processing device.

In an embodiment, the subsystem is implemented using the processor.

The subsystem can assume an authorized state and an unauthorized state and can be implemented as such using system registers in which system states are stored. System registers are used to store the states of alarms, aborts, faults, exceptions and traps which have been detected by the processor.

In an embodiment, the modification device and the continuation point memory are implemented using software which runs on the processor.

The modification device and the continuation point memory are implemented using software which is executed in the processor. The continuation point memory may be, for example, a variable whose value is modified using an appropriate programming instruction.

FIG. 1 shows an exemplary embodiment of the data processing device according to the invention having a processor P for executing an operating sequence BA. The operating sequence BA may include a plurality of partial operating sequences TB. At a point in time T1 at which one of the partial operating sequences TB begins, a sequence controller AS drives a modification device M in such a manner that it reads in a continuation point FS for the partial operating sequence TB. The continuation point FS is intended to mean that point in the operating sequence BA which is executed by the processor P after the partial operating sequence TB has been processed. In the modification device M, the continuation point FS is modified and a new, unauthorized continuation point FS' is generated. If the continuation point FS is described by a number, for example a return address, this may be effected using an adder A which adds a modification constant MK, which is stored in a constant memory C, to the continuation point FS. The modification constant MK may be a constant or a random number. Each partial operating sequence TB is associated with its own modification constant MK, the modification constants MK of different partial operating sequences TB differing from one another. The unauthorized continuation point FS' is stored in a continuation point memory F. The modification to the continuation point FS can be reversed again in the modification device M by the contents of the continuation point memory F being supplied to the adder A again, in which case, however, the latter no longer adds the modification constant MK but rather subtracts it. It is essential for the choice of the modification constant MK that the latter is selected in such a manner that an unauthorized continuation point FS' is generated. An unauthorized continuation point FS' results in an unauthorized state of the subsystem T. After the continuation point has been generated, the partial operating sequence TB is executed by the processor P. After the partial operating sequence TB has been executed, the sequence controller AS drives the modification device M again but in such a manner that the modification to the continuation point FS is reversed by means of subtraction, as described above, and an authorized continuation point FS is output at the output of the modification device M. An authorized continuation point FS is, for example, that point in the operating sequence BA which is intended to be executed by the processor after the partial operating sequence TB has been executed correctly. In the subsystem T, the authorized continuation point FS or the unauthorized continuation point FS' results in an authorized or an unauthorized state. The state of the subsystem T is evaluated using the evaluation unit AE after the partial operating sequence TB and the sequence control AS have been executed. In the case of an authorized state, processing of the operating sequence BA is continued with the next partial operating sequence TB. If, in contrast, an unauthorized state of the subsystem T is detected, that is, the unauthorized continuation point FS' has not been reset or has been incorrectly reset and the partial operating sequence TB has not been ended properly. The reasons for this may be, for example, an attack in which the instruction counter of the processor P has been manipulated. In this case, the evaluation unit AE outputs a signal which stops the processor P of the data processing device.

In one embodiment, the evaluation unit AE is part of the processor P. Particularly if the continuation point FS is denoted using a return address, the memory management unit or the memory protection unit of the processor P can be used for this purpose. An unauthorized return address is detected as a fault by these units. In another design, the sequence controller AS is implemented, within the processor P, together with a corresponding program. In the same manner, the modification device M may also use registers of the processor P and the arithmetic unit of the latter to modify the continuation point FS. Furthermore, the subsystem T may be implemented using system states of the processor P. In this case, the states are detected by the hardware of the processor P and can access processor-internal fault detection mechanisms. Fault detection mechanisms of this type may be, for example, faults, traps, aborts or interrupts which change the normal operating sequence BA. It is particularly advantageous in these embodiments that there is no need for additional hardware for the modification device M, the subsystem T, the sequence controller AS and the evaluation device AE. Furthermore, system states of this type are available on virtually all hardware platforms and do not require any explicit checking by means of software, with the result that the operating sequence is encumbered only with very little overhead in order to monitor correct operation.

FIG. 2 shows the principle of the method for monitoring the correct operation of the data processing device. In this case, it is assumed that the operating sequence BA is effected in a plurality of partial operating sequences TB. The left-hand part of the figure shows three partial operating sequences TB1, TB2 and TB3 which follow one another sequentially. The right-hand side of FIG. 2 shows, by way of example, the modification in the sequence of the partial operating sequence TB2 which is executed after the partial operating sequence TB1 has been executed. In this case, the partial operating sequence TB2 on the left-hand side is replaced with four steps. In the first step, a subsystem state is changed to an unauthorized state. In the second step, the partial operating sequence TB2 is executed. The subsystem state is subsequently reset to an authorized state and the subsystem state is finally evaluated. In this case, each of the partial operating sequences TB1, TB2 and TB3 can be modified in the manner described above. As explained in connection with FIG. 1, the subsystem state is reset to the authorized state again only when a partial operating sequence has been executed correctly. Evaluating the subsystem state can thus detect whether the operating sequence BA has been manipulated. It is also possible for a further partial operating sequence to be started and executed as part of one of the partial operating sequences. This further partial operating sequence can also be correspondingly modified, in which case it is necessary to buffer-store the continuation point for the original partial operating sequence and to restore it again after the further partial operating sequence has been executed.

Figure 3:
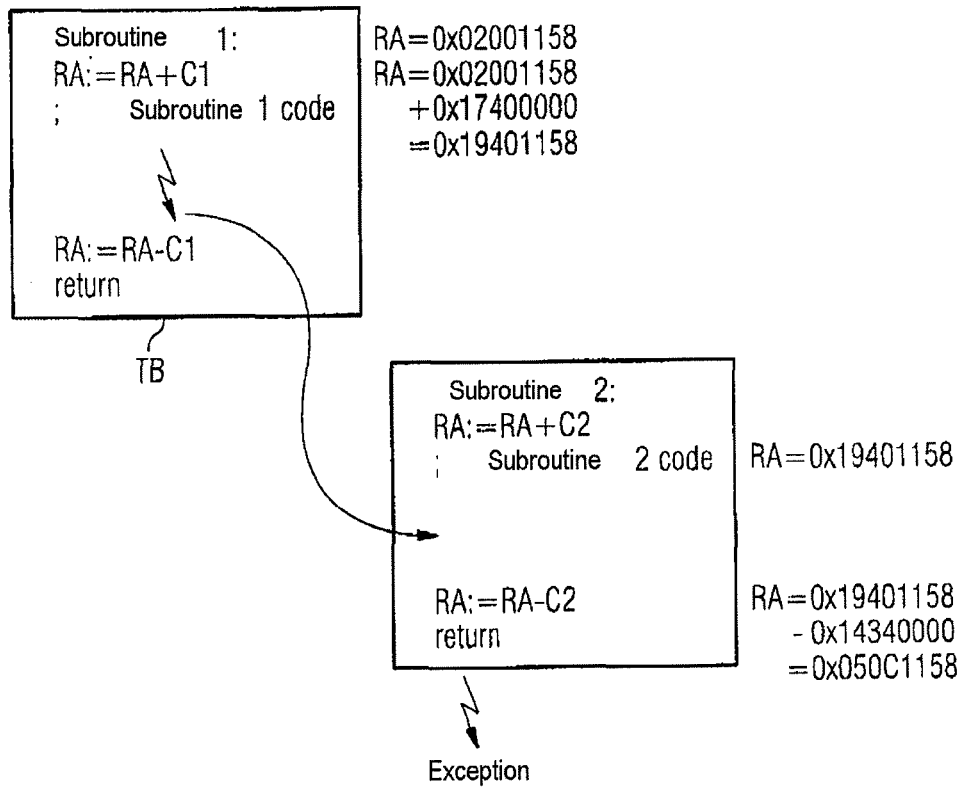
FIG. 3 shows a program section for an exemplary embodiment.

FIG. 3 shows one implementation of a partial operating sequence TB in the form of a subroutine. It is assumed below that the continuation point FS is the return address of the subroutine and the modification device M containing the adder A and the constant memory C as well as the continuation point memory F is implemented together with the sequence controller AS using the processor P with an appropriate program, the subsystem T being implemented using a system state of the processor P and the return address being evaluated in a memory management unit or a memory protection unit of the processor P.

The left-hand side of FIG. 3 shows proper operation. The partial operating sequence TB is executed by the subroutine 1. In this case, the return address RA of the subroutine 1 denotes the continuation point FS, that is to say that point at which execution of the operating sequence BA is continued after the subroutine 1 has ended. In a first instruction, the return address RA is modified by adding a constant C1 to it. By way of example, the return address is selected to be RA=0x02001158 and C1=0x17400000. The modified return address then results as RA=0x19401158. The subroutine instructions are then executed. If a fault or an attack does not occur, the return address RA is reset to the original value again by subtracting the constant C1 again. Return to the continuation point is then effected using the return instruction, so that further instructions or subroutines can be executed.

The right-hand side of FIG. 3 illustrates the fault or attack. Before the subroutine 1 is ended and before the return address RA is reset, a jump is made to a subroutine 2 as a result of an attack. In this case, the return address RA remains unchanged but was previously modified by entry into the subroutine 1. After the instructions in the subroutine 2 have been executed, an attempt is made to reset the return address RA by subtracting the constant C2=0x14340000 which is associated with the subroutine 2. However, the unauthorized return address RA=0x050C1158 is obtained. A return to this address gives rise to an exception in the memory management unit or memory protection unit of the processor P and the attack or fault can be detected.

The constants C1 and C2 can be selected in such a manner that the resultant return addresses point to a nonexistent memory area. They may also point to a memory area which, although being present, does not contain any executable code. Furthermore, the constants C1 and C2 can be selected in such a manner that the return addresses refer to an area for which there are no access rights. Another possible way of selecting the constants C1 and C2 is for the modified return addresses RA to point, beyond the boundaries of a memory area, to another memory area if such a change in memory areas can be detected by the processor. They may also be selected in such a manner that the modified return address RA points, for example, to the middle of an instruction having a length of four bytes and thus triggers a fault. If, in contrast, the modification constants C1 and C2 are selected to be zero, the correct operation of the data processing device cannot be monitored. The constants for different subroutines must also be selected to be different so that unintentional resetting by another subroutine is precluded.

Figure 4:
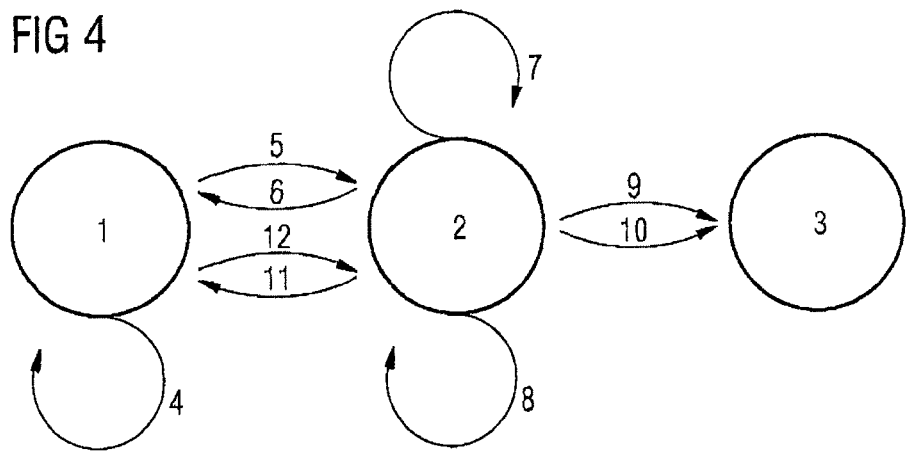
FIG. 4 shows an exemplary state diagram for the operation of a data processing device according to the invention.

FIG. 4 shows a state diagram for the exemplary embodiment in FIG. 3. Three states 1, 2 and 3 are shown, state 1 representing an authorized return address RA, state 2 representing an unauthorized return address RA and state 3 representing the presence of an unauthorized state. From state 1, one lands in state 1 again via the transition 4, the transition 4 being characterized by a jump back from a subroutine in which the return address RA was not modified. The transition 5 from the state 1 to the state 2 occurs when the return address RA of the subroutine which is running is modified. The transition 6, in which the return address RA is reset again, again results in an authorized return address RA and in state 1. State 2 is retained during the transitions 7 and 8 in which the return address RA is reset using an incorrect constant or a further subroutine is branched to on account of an attack or a fault. The transition from the state 2 to the exception 3 is achieved by means of the transitions 9 and 10, transition 9 representing a return, that is to say evaluation of the subsystem state, and the transition 10 representing a direct attack or fault. Furthermore, the transitions 11 and 12 are also shown. When the further subroutine is called in the transition 11, its return address is first of all unchanged and is thus authorized, with the result that the state 1 is reached with an authorized return address. The return address of the further subroutine is then modified in the transition 5 in such a manner that an unauthorized return address is obtained and state 2 is assumed again. Transition 12 represents the situation in which there is a state with an authorized return address and a return to the caller of the current subroutine is executed. In this case, the return address of the caller is restored, which address was changed to an unauthorized value at an earlier point in time by transition 5.

The invention can be used to monitor the operation of a data processing device without the need for hardware measures, for example sensors. Since mechanisms which exist in any hardware architecture are used to detect unauthorized states, it is possible to dispense with storing additional states. Since there is no need for any testing instructions either, very little programming complexity, which can also be automated, results. Monitoring without specialized hardware and without being restricted to specific applications or hardware platforms is thus possible.

What is claimed is:

1. A method for monitoring correct operation of a data processing device, comprising:
changing a subsystem from an authorized state to an unauthorized state before a partial operating sequence is executed, the unauthorized state not interfering with the execution of the partial operating sequence as long as the state of the subsystem is not being evaluated,
wherein the authorized state corresponds to a correct return address of a program which controls the partial operating sequence, and the unauthorized state corresponds to an incorrect return address of the program;
executing the partial operating sequence;
resetting the subsystem state from the unauthorized state to the authorized state after the partial operating sequence has been executed; and
evaluating the subsystem state.

2. The method as claimed in claim 1, wherein the data processing device executes as if the evaluation of the subsystem state revealed an authorized state, and continues operation at the return address.

3. The method as claimed in claim 1, wherein the incorrect return address is reversibly determined from the correct return address.

4. A method for monitoring a correct operation of a data processing device, the method comprising: inserting instructions for changing a subsystem state from an authorized state to an unauthorized state before a partial operating sequence is monitored, wherein the authorized state corresponds to a correct return address of a program which controls the partial operating sequence, and the unauthorized state corresponds to an incorrect return address of the program; inserting instructions for resetting the subsystem state from the unauthorized state to the authorized state; inserting instructions for evaluating the subsystem state after the partial operating sequence is monitored into a program which controls the partial operating sequence; and executing the partial operating sequence.

5. The method as claimed in claim 4, wherein the instructions are automatically inserted into the program when compiling or interpreting the program.

6. The method as claimed in claim 4, wherein the incorrect return address is generated by adding a constant or a random number from the correct return address of the program in order to control the partial operating sequence.

7. The method as claimed in claim 6, wherein in order to reset the subsystem state from the unauthorized state to the authorization state after the partial operating sequence has been executed, the method further comprises reversing the addition of the constant or of the random number.

8. The method as claimed in claim 7, wherein the subsystem state is evaluated using a memory management unit or a memory protection unit.

9. The method as claim in claim 8, wherein the unauthorized state triggers an alarm, an abort, a fault, an exception, or a trap in the data processing device.

10. The method as claim 9, wherein the unauthorized state interrupts operation of the data processing device during evaluation.

11. A data processing device comprising: a processor; a subsystem which is configured to assume an authorized state and an unauthorized state; a sequence controller; a modification device configured to modify a return address; a return address memory configured to store the return address; and an evaluation unit configured to evaluate a state of the subsystem, wherein the sequence controller is configured to: store a correct return address for a partial operating sequence in the return address memory before the partial operating sequence is executed by the processor, engage the modification device to change the correct return address to an incorrect return address so that, when a state of the subsystem is being evaluated by the evaluation unit, an unauthorized state is detected, engage the modification device to reverse the change in the return address after the partial operating sequence has been executed by the processor to change the subsystem state from the unauthorized state to the authorized state, and evaluate the state of the subsystem in the evaluation unit, wherein the authorized state corresponds to the correct return address of a program which controls the partial operating sequence, and the unauthorized state corresponds to the incorrect return address of the program.

12. The data processing device as claimed in claim 11, wherein the evaluation unit is a memory management unit or a memory protection unit of the processor.

13. The data processing device as claimed in claim 11, wherein the sequence controller is implemented by the processor.

14. The data processing device as claimed in claim 11, wherein the subsystem is implemented by the processor.

15. The data processing device as claimed in claim 11, wherein the modification device and the return address memory are implemented by software which runs on the processor.

16. A data processing device comprising: a processor; a subsystem which is configured to assume an authorized state and an unauthorized state; a modification means for modifying a return address; an evaluation unit for evaluating a state of the subsystem; and a sequence controlling means for storing a correct return address for a partial operating sequence in a return address memory before the partial operating sequence is executed by the processor, the sequence controlling means is also for engaging the modification means to change the correct return address to an incorrect return address so that, when a state of the subsystem is being evaluated by the evaluation unit, an unauthorized state is detected, the sequence controlling means is also for engaging the modification means to reverse the change in the return address after the partial operating sequence has been executed by the processor to change the subsystem state from the unauthorized state to the authorized state, and the sequence controlling means is also for evaluating the state of the subsystem in the evaluation unit, wherein the authorized state corresponds to the correct return address of a program which controls the partial operating sequence, and the unauthorized state corresponds to the incorrect return address of the program.

17. A data processing device comprising: means for changing a subsystem from an authorized state to an unauthorized state before a partial operating sequence is executed, the unauthorized state not interfering with the execution of the partial operating sequence as long as the state of the subsystem is not being evaluated, wherein the authorized state corresponds to a correct return address of a program which controls the partial operating sequence, and the unauthorized state corresponds to an incorrect return address of the program; means for executing the partial operating sequence; means for resetting the subsystem state from the unauthorized state to the authorized state after the partial operating sequence has been executed; and means for evaluating the subsystem state.

* * * * *